United States Patent [19]

Suzuki et al.

[11] 3,890,336
[45] June 17, 1975

[54] CERTAIN THIAZOLES CONTAINING PHOSPHORUS ACID ESTERS

[75] Inventors: Fumio Suzuki; Mamoru Hayashi; Ikuo Kawakami; Fujio Motohashi; Yoshiki Iwabuchi, all of Tokyo, Japan

[73] Assignee: Nissan Chemical Industries, Ltd., Tokyo, Japan

[22] Filed: Feb. 28, 1973

[21] Appl. No.: 336,834

[30] Foreign Application Priority Data
Mar. 17, 1972   Japan.................. 47-27212

[52] U.S. Cl.......... 260/302 E; 260/302 R; 424/200
[51] Int. Cl............................................. C07d 91/32
[58] Field of Search .................. 260/302 E

[56] References Cited
UNITED STATES PATENTS
3,574,223   4/1971   Ratz et al. .............. 260/302 E
FOREIGN PATENTS OR APPLICATIONS
932,388   7/1963   United Kingdom............ 260/302 E
965,520   7/1964   United Kingdom............ 260/302 E

*Primary Examiner*—R. J. Gallagher
*Attorney, Agent, or Firm*—Oblon, Fisher, Spivak, McClelland & Maier

[57] ABSTRACT

An insecticidal and miticidal compound having the formula

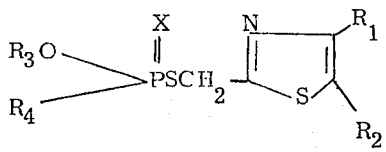

wherein $R_1$ represents a hydrogen atom or a methyl group, $R_2$ represents a halogen atom or a nitro group, $R_3$ represents a lower alkyl group, $R_4$ represents a lower alkoxy or phenyl group and X represents a sulfur or oxygen atom.

3 Claims, No Drawings

CERTAIN THIAZOLES CONTAINING PHOSPHORUS ACID ESTERS

BACKGROUND OF THE INVENTION

1. Field of the Invention

This invention relates to insecticidal compounds. More particularly, it relates to novel thiazolyl phosphorothioates which have excellent insecticidal and miticidal effects and low mammalian toxicity.

2. Description of the Prior Art

Various types of phosphates and thiophosphates are known to exhibit insecticidal effects. Some have been used as insecticides. In addition, certain thiazolyl esters have also exhibited these effects. However, the known thiazolyl ester derivatives have shown a high mammalian toxicity which is coexistant with the insecticidal effects.

A need therefore, exists for thiazolyl esters of phosphates or thiophosphates which exhibit good insecticidal properties while having low mammalian toxicity.

SUMMARY OF THE INVENTION

Accordingly, one object of this invention is to provide compounds which have high insecticidal effects and low mammalian toxicity.

Another object of this invention is to provide a new use for thiazolyl phosphorothioates.

Yet another object of this invention is to provide a process for preparing thiazolyl phosphorothioates.

Briefly, these objects and other objects of this invention as hereinafter will become readily apparent can be achieved by providing an insecticidal and miticidal compound which comprises thiazolyl phosphorothioates having the formula,

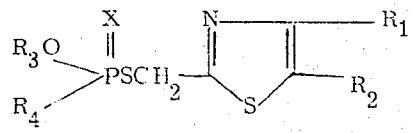

wherein $R_1$ represents a hydrogen atom or methyl group, $R_2$ represents a halogen atom or nitro group, $R_3$ represents a lower alkyl group, $R_4$ represents a lower alkoxy group or phenyl group and X represents a sulfur or oxygen atom.

DESCRIPTION OF THE PREFERRED EMBODIMENTS

A study has been conducted on various phosphate derivatives, especially thiazolyl esters, and it has been found that the successful preparation of thiazolyl phosphorothioates has resulted in a class of compounds which exhibit remarkable insecticidal effects and which have remarkably low mammalian toxicity. (Throughout the specification, the term insecticidal includes the meaning of the term miticidal.) The compounds of this invention have a halogen atom or a nitro group ($R_2$) in the 5-position of the thiazolyl group. The halogen atom is preferably Cl or Br. According to tests on these compounds, the insecticidal effect exhibited is dependent upon the Cl, Br or $NO_2$ group present at $R_2$ as well as the groups present at $R_3$ and $R_4$.

In general, optimum results are obtained when $R_2$ is Cl. No substantial differences in activity are found when $R_2$ is Br or $NO_2$. Table I is a list of typical compounds of this invention together with the refractive index of each compound.

TABLE 1

| Compound No. | Structure | |
|---|---|---|
| (1) | (CH₃O)₂P(S)-SCH₂-[thiazole-CH₃,Cl] | $N_D^{20} = 1.5840$ |
| (2) | (C₂H₅O)₂P(S)-SCH₂-[thiazole-CH₃,Cl] | $N_D^{20} = 1.5671$ |
| (3) | (C₂H₅O)₂P(O)-SCH₂-[thiazole-CH₃,Cl] | $N_D^{20} = 1.5223$ |
| (4) | (C₂H₅O)(C₆H₅)P(S)-SCH₂-[thiazole-CH₃,Cl] | $N_D^{20} = 1.6173$ |
| (5) | (CH₃O)₂P(S)-SCH₂-[thiazole-CH₃,Br] | $N_D^{20} = 1.6010$ |

(6) 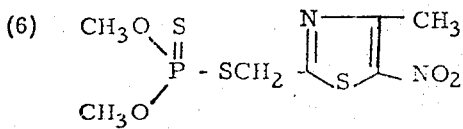   $N_D^{20} = 1.6062$ (7) 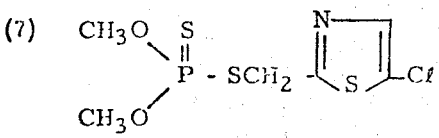   $N_D^{20} = 1.5860$ (8) 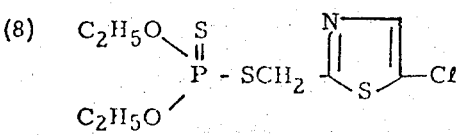   $N_D^{20} = 1.5730$ The compounds of this invention show remarkable insecticidal effects for the protection of agriculture products and forests, for the preservation of stored products and for sanitary purposes. The compounds have been found to be effective against the following insects:

Chewing insects:
| | |
|---|---|
| rice stem borer | (Chilo suppressalis) |
| Tea tortrix | (Homona magnanima) |
| diamondback moth | (Plutella maculipennis) |
| common cabbageworm | (Pieris rapae) |
| tobacco cutworm | (Prodenia litura) |
| oriental fruit moth | (Grapholitha molesta) |
| peach fruit moth | (Carposina niponensis) |
| mulberry leaf beetle | (Fleutiauria armata) |
| lady beetle | (Epilachna vigintioctapunctata) |
| german cockroach | (Blattela germanica) |

Sucking insects:
| | |
|---|---|
| green rice leaf hopper | (Nephotettix cinticeps) |
| smaller brown planthopper | (Laodelphax striatellus) |
| comstock mealybug | (Pseudococus comstoki) |
| aphids | (Myzus percicae, Brevicoryne brassicae, Aphis gossypii) |
| San Jose scale | (Quadraspidiotus perniciosus) |
| Other insects | |
| house fly | (Musca domestica) |
| mosquito | (Culex pipiens) |

Mites:
| | |
|---|---|
| two spotted mite | (Tetranychus urticae) |
| citrus red mite | (Panonychus citri) |

The insecticidal compounds of this invention have remarkably low mammalian toxicity in comparison to other thiazolyl phosphorothioates such as the compound having the formula

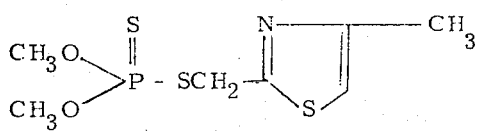

which has an LD$_{50}$ value of 17.5 mg/kg. On the other hand, a compound of this invention having the formula

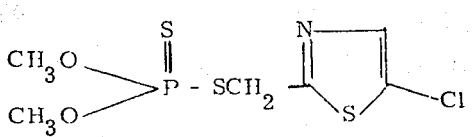

has a remarkably low toxicity, which has an LD$_{50}$ value of 1790 mg/kg. Moreover, the residual amounts of the compounds of this invention are low which offers a significant advantage over the other thiazolyl phosphorothioate derivatives together with the low mammalian toxicity. For example, O,O-dimethyl-S((5-chloro-2-thiazolyl)methyl) phosphorodithioate was applied to a wet paddy filed, wherein 3.3 ppm of the active ingredient was present in the soil. However, 10 days after the application of the active ingredient, only 1.0 ppm of the ingredient remained. The active ingredient was also applied to a dried, upland field, wherein 9.2 ppm of the active ingredient was present in the soil. However, 10 days after the application of the active ingredient only 0.1 ppm of the ingredient remained. Accordingly, the half life of the compound of this invention was less than 10 days in both applications.

The compounds of this invention can be applied against insects and mites in any of the known forms, such as powders, wettable powders, emulsions and granules. The insecticidal compounds of this invention can be used together with other insecticides, fungicides, herbicides or plant growth regulators in any desirable quantity.

The insecticidal compounds of this invention can be prepared by reacting a phosphorothioate or phosphorodithioate having the formula

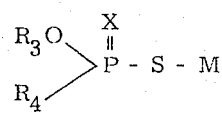

wherein R$_3$ and R$_4$ are defined as above and M represents an alkali metal or ammonium group with 2-halomethylthiazole having the formula

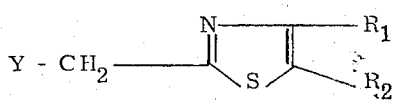

wherein X, R$_1$ and R$_2$ are defined as above and Y represents a halogen atom.

The ammonium and alkali metal salts of phosphorothioates such as O,O-dialkylphosphorothioates and O-alkylphenylphosphonothioates are known starting materials. The 2-halomethylthiazole starting material can be prepared by the following procedure. 2-Acetoxymethylthiazole is hydrolyzed with an alkali hydroxide to give 2-hydroxymethylthiazole. Thionylchloride is then reacted with 2-hydroxymethylthiazole to yield 2-chloromethylthiazole as the product.

The product can be halogenated or nitrated by reacting 2-chloromethylthiazole with chlorine, sulfurylchloride, bromine, N-bromosuccimide, nitric acid or a mixture of nitric acid and sulfuric acid at relatively low temperatures by gradually adding a halogenating agent in an inert organic solvent, or by adding a nitrating agent in sulfuric acid.

Other procedures for preparing halomethylthiazole derivatives are as follows: 2-Acetoxymethylthiazole is halogenated or nitrated to introduce a halogen atom or a nitro group in the 5-position of the thiazole ring, and then is hydrolyzed with a base. The hydrolyzed derivative is reacted with thionylbromide to prepare 2-bromomethylthiazole as shown in the following sequence of reactions.

yield acetylglycolothioamide. The product is then reacted with monochloroacetone when $R_1$ is methyl or with dichloroethyl ether when $R_1$ is hydrogen, in an organic solvent at 60°–80° C for several hours. The reaction mixture is neutralized with sodium carbonate to yield 2-acetoxymethylthiazole.

It is preferable to conduct the reaction at 20°–80° C, preferably 40°–50° C, in a mixed phase consisting of water and a water-insoluble organic solvent such as toluene, benzene, chloroform or carbon tetrachloride. The ratio of the water-insoluble organic solvent to water is usually in a range of 1 to 0.2 – 3, preferably 1 to 0.5 – 1.5. The catalysts used in the reaction are preferably sodium iodate, a tertiary amine or pyridine. Especially preferable are sodium iodate and triethylamine. When the reaction is conducted in a mixed phase consisting of water and a water-insoluble organic solvent, yields as high as 80 – 90% can be obtained. However, when the reaction is conducted only in organic solvents, yields of about 40 – 50% are obtained.

The following reaction sequence illustrating the preparation of one compound of this invention is typical of the reactions used for the preparation of all of the compounds of the invention.

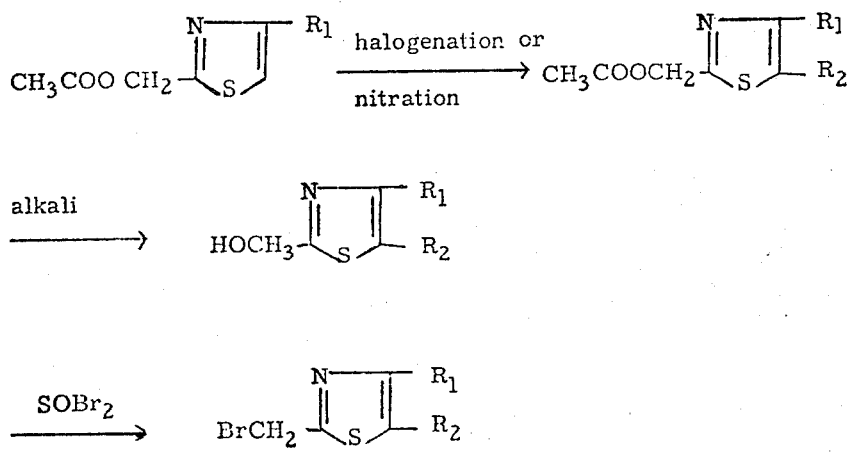

2-Acetoxymethylthiazole can be prepared as follows: Acetylglycolonitrile is reacted with hydrogen sulfide to

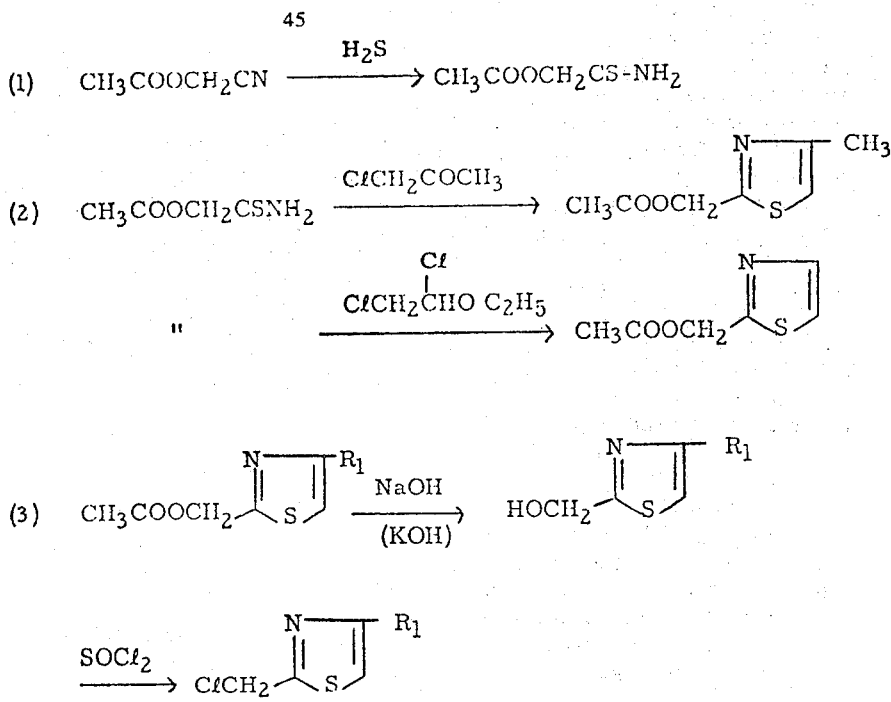

(4)

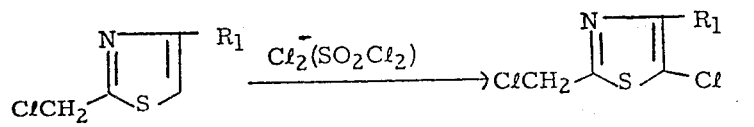

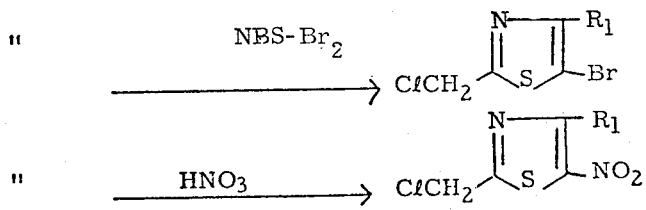

(5)

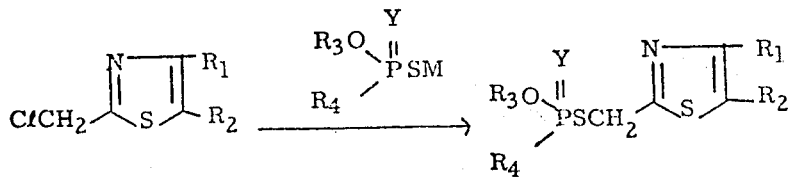

$R_1$, $R_2$, $R_3$, $R_4$, Y and M are defined as indicated earlier.

Having generally described this invention, a further understanding can be obtained by reference to certain specific examples which are provided herein for purpose of illustration only and are not intended to be limiting unless otherwise specified.

EXAMPLE 1

Hydrogen sulfide was introduced into a solution which was prepared by mixing 93 g of acetylglycolonitrile which was synthesized by the Grudzinski method disclosed in Chemical Abstracts, 55, 23, 330, 180 ml of anhydrous ethanol and 28 g of triethylamine at 15° – 20° C for about 3 hours until the end-point was reached. The end-point was determined by the absence of a peak attributable to acetylglyconitrile in a gas-chromatogram of the solution.

The reaction solution was cooled to a low temperature to yield 99.8 g of crystals. The crystals were recrystallized from ethanol to obtain white crystals of acetylglycolothioamide having a melting point of 74.5° – 75.5° C. A 20 g amount of acetylglycolothioamide and 13.9 g of monochloroacetone in 100 ml of benzene were stirred at 60° – 70° C for 3 hours. After the reaction, the reaction solution was cooled and the supernatant liquid was separated and was extracted with 30 ml of water. The liquid was neutralized with sodium carbonate and extracted with benzene. The extract was dried with sodium sulfate and the solvent was evaporated to yield 6.6 g of 4-methyl-2-acetoxymethylthiazol.

A 6.5 g amount of 4-methyl-2-acetoxymethylthiazol was dissolved in 15.2 g of an aqueous 20% sodium hydroxide solution by slightly heating the solution. The solution was then washed once with 20 ml of benzene to remove any unreacted compound. The water phase was neutralized with 35% hydrochloric acid to a pH of 7 and was extracted with benzene. The extract was dried and the solvent was evaporated to yield 2.6 g of 4-methyl-2-hydroxymethylthiazole. A 2.6 g amount of the resulting compound was dissolved in 10 ml of chloroform. A 2.7 g quantity of thionylchloride in 10 ml of chloroform was added dropwise to the chloroform solution at room temperature to precipitate the hydrochloride salt of the reaction product. The mixture was continuously heated at 40° C for 30 minutes.

The product was extracted with water, neutralized with sodium carbonate to a pH of 7 and then extracted with chloroform. The extract was dried and the solvent was evaporated to yield 2.9 g of 4-methyl-2-chloromethylthiazole. A 2.9 g amount of the product was dissolved in 30 ml of propionic acid. Chlorine gas, diluted with nitrogen gas in a ratio of 1 : 9, was slowly introduced in the solution for 5 hours.

After confirming by gas chromatography that no unreacted compound remained, the solvent was evaporated under reduced pressure, and the residue was dissolved in benzene. The extract was dried with sodium sulfate, and the solvent was evaporated to yield 2.5 g of 4-methyl-5-chloro-2-chloromethylthiazole. A 1.5 g amount of the resulting compound was reacted with 2.0 g of ammonium O,O-dimethylphosphorodithioate in 30 ml of acetone at 30° – 35° C for 3 hours. After filtering the reaction solution, the mother liquor (acetone) was evaporated and benzene was added to the residue. The benzene solution was washed with water and then benzene was evaporated to yield 3.0 g of the crude product.

The crude compound was eluted by silica gel thin layer chromatography with a 2 : 1 mixture of hexane and acetone, and then further eluted with benzene to yield O,O-dimethyl-S-((4-methyl-5-chloro-2-thiazolyl)methyl) phosphorodithioate. ($N_D^{20}$ = 1.5840).

EXAMPLE 2

A 1 g amount of 4-methyl-2-chloromethylthiazole of Example 1 was mixed with 1.2 g N-bromosuccimide in 30 ml of carbon tetrachloride and the mixture was heated under reflux for 14 hours. The reaction product was filtered and the solvent was evaporated from the mother liquor to yield 1.5 g of 4-methyl-5-bromo-2-chloromethylthiazole. A 1.5 g quantity of the resulting product was reacted with 1.5 g of ammonium O,O-dimethylphosphorodithioate in 30 ml of acetone at room temperature for 4 hours, and a crude product was obtained in accordance with the procedure of Example 1. The crude product was purified in accordance with the process of Example 1 by thin layer chromatography to yield O,O-dimethyl-S((4-methyl-5-bromo-2-thiazolyl)-methyl) phosphorodithioate. ($N_D^{20}$ = 1.6010).

EXAMPLE 3

A 2 g amount of 4-methyl-2-chloromethylthiazole of Example 1 was dissolved in 5 g of concentrated sulfuric acid and 4 g of an acid mixture (sulfuric acid and 44.7% of nitric acid) was added dropwise to the solution at 0° –10° C for 30 minutes. After the reaction, the reaction mixture was placed in an ice water bath, and the solution was extracted with chloroform to yield 2.0 g of 4-methyl-5-nitro-2-chloromethylthiazole (black oily product). A 2.0 g amount of this product was reacted with 2.5 g of ammonium dimethylphosphorodithioate in 50 ml of acetone at room temperature for 8 hours to yield a crude product in accordance with the procedure of Example 1. The product was purified in accordance with the process of Example 1 by thin layer chromatography to yield O,O-dimethyl-S((4-methyl-5-nitro-2-thiazolyl)methyl) phosphorodithioate. ($N_D^{20}$ = 1.6062).

EXAMPLE 4

In a flask equipped with a reflux condenser having a water separator, 53.2 g of acetylglycolothioamide, 57.2 g of 1,2-dichloroethylether and 120 ml of benzene were charged, and the mixture was dried and reacted under reflux to 3 hours. After cooling the reaction mixture, it was extracted with 150 ml of water. The extract was neutralized with sodium carbonate and extracted with ether to yield 23.4 g of 2-acetoxymethylthiazole. A mixture of 5 g of potassium hydroxide, 5 ml of water and 10 ml of methanol was added to 17.7 g of 2-acetoxymethylthiazole in 20 ml of methanol. The reaction that followed was an exothermic reaction. The reaction mixture was cooled to room temperature and was stirred for 20 minutes. The solution was neutralized with 35%-HCl to a pH of 7, and was filtered. Methanol was evaporated from the mother liquor under reduced pressure and the residue was extracted with chloroform to yield 9.0 g of an oily product. 2-Hydroxymethyl thiazole having a boiling point of 73° – 76° C/2 mmHg was obtained by distillation as pale yellow crystals.

The resulting procut was recrystallized from a 2 : 1 mixture of hexane and acetone to yield crystals having a melting point of 63° – 64° C. A 5.0 g amount of the compound was dissolved in 10 ml of carbon tetrachloride and 5.4 g of thionylchloride was added dropwise at 30° – 40° C for 30 minutes to react the components. The reaction solution was extracted with 30 ml of water and the water phase was neutralized with sodium acetate. The treated solution was extracted with chloroform to yield 5.8 g of 2-chloromethylthiazole. A 5.8 g amount of the product was dissolved in 10 ml of carbon tetrachloride and 6.3 g of sulfurylchloride was added dropwise to the solution. The subsequent reaction was conducted at 30° – 40° C for 1 hour. After the reaction, the reaction mixture was washed with water, and carbon tetrachloride was evaporated from the oil phase under reduced pressure to yield 3.1 g of 5-chloro-2-chloromethylthiazole.

The water phase was neutralized with sodium acetate and then was extracted with chloroform to recover 1.5 g of the reaction product which contained unreacted material. A 2.0 g amount of 5-chloro-2-chloromethylthiazole was reacted with 2.5 g of ammonium dimethyl-phosphorodithioate in 30 ml of acetone at 30° C for 3 hours and a crude product was obtained in accordance with the procedure of Example 1. The produce was purified in accordance with the procedure of Example 1 by thin layer chromatography to yield O,O-dimethyl-S((5-chloro-2-thiazolyl)bethyl)phosphorodithioate. ($N_D^{20}$ = 1.5860).

EXAMPLE 5

2-Acetoxymethylthiazole (b.p.62 - 63°C/15 mmHg) of Example 4, was chlorinated and hydrolyzed with potassium hydroxide. The product was recrystallized from a 2 : 1 mixture of hexane and acetone to yield 5-chloro-2-hydroxymethylthiazole having a melting point of 73°C. Thionylbromide was added dropwise to a solution of 7.5 g of 5-chloro-2- hydroxymethylthiazole in 30 ml of chloroform for 1 hour and then stirred for another hour at room temperature. The mixture was stirred at 40° C for 2 more hours and at 50° – 60° C for 30 minutes until a slurry of the hydrobromide salt was obtained.

The slurry was admixed with 7.5 ml of water and was neutralized with sodium bicarbonate to give a solution of 5-chloro-2-bromomethyl-thiazole in chloroform. A 26.3 cc amount of an aqueous solution of sodium O,O-dimethylphosphorodithioate (2.28 mole/l) and 0.25 g of sodium iodide were added to the solution of 5-chloro-2-bromomethylthiazole, and the mixture was reacted at 40° C for 10 hours. The reaction product was separated and washed with water and a 5% aqueous sodium carbonate solution. The solution was dried over sodium sulfate, and then chloroform was evaporated under reduced pressure to yield 13.3 g of O,O-dimethyl-S(5-chloro-2-thiazolyl)methyl)phosphorodithioate. The product obtained had a purity of 87.5% as established by thin layer chromatography (benzene eluent). The yield based on 5-chloro-2-hydroxy-thiazole was 80.3%.

Formulation of Composition of the Active Ingredients of this Invention

| (1) | Emulsion | |
|---|---|---|
| | *Compound No. 7 | 50 parts |
| | Dimethylformamide | 35 parts |
| | Emulsifier | 15 parts |

The components were mixed and then diluted with 500 – 2000 times the quantity of water. The aquesou solution was sprayed in amounts of 50 – 400 1/10 ares.

(2) Wettable Powder

| | |
|---|---|
| *Compound No. 2 | 50 parts |
| Zeeklite | 45 parts |
| Emulsifier (Solphol 8048 Toho Chem.) | 3 parts |
| Emulsifier (Runox 1000 Toho Chem.) | 2 parts |

The components were uniformly mixed and crushed to form a wettable powder. The wettable powder was diluted with 500 – 2000 times the quantity of water. The suspension was sprayed in amounts of 50 – 400 1/10 ares.

(3) Granules

| | |
|---|---|
| *Compound No. 3 | 6 parts |
| bentonite | 94 parts |

The components were uniformly mixed and crushed. A small amount of water was added to the combined solids and the mixture was stirred to form granules from an extrusion type granulating apparatus. The product was dried and the granules were applied in amounts of 3 – 4 kg/10 ares.

(4) Powder

| | |
|---|---|
| *Compound No. 8 | 2 parts |
| Talc | 98 parts |

The components were mixed and applied in amounts of 3 – 4 kg/10 ares.

*Compounds 2, 3, 7 and 8 are shown in Table I.

The following is some experiments which were conducted with the compositions of this invention.

Test Method:

1. Contact test for killing houseflys

A 1 cc quantity of a 0.01% solution of each of the insecticidal compounds of this invention in acetone was uniformly spread over the bottom of a Petri dish. Acetone was completely evaporated at room temperature. Ten adult houseflies were placed in the dish, which was covered with a plastic cover containing many holes. The Petri dish was kept at 25° C and percent mortality of the houseflies was determined 24 hours after the treatment. The test was repeated twice and the results are shown in Table II.

2. Systemic (permeate) test for killing green rice leafhopper An o/w type emulsion containing 0.01% of an active ingredient was formed for each of the insecticidal compounds of this invention. The root of a rice plant was immersed in the emulsion and the rice plant was placed in a glass cylinder. About 15 adult green rice leafhoppers were placed in the cylinder which was kept at a temperature of 25°C. After 48 hours, the mortality percent of the leafhopper was observed. The test was repeated twice and the results are shown in Table II.

3. Contact test for killing green rice leafhopper

The stems and leaves of a rice seedling were dipped in a 0.01% o/w type emulsion of each of the insecticidal compounds of this invention for 10 seconds. The stems and leaves were dried in air and were covered with a glass cylinder. Fifteen adult green rice leafhoppers were places in the cylinder which was kept at 25° C for 48 hours to observe the percent mortality. The test was repeated twice and the results are shown in Table II.

4. Contact test for killing rice stem borer

Each of the insecticidal compounds of this invention was dissolved in acetone to form a 0.001% solution. A 1 cc quantity of the solution was placed on the bottom and the cover of a Petri dish having a diameter of 7.5 cm. The acetone in the solutions was allowed to evaporate. Ten second instar larva of the rice stem borer were placed in the Petri dish which was dept at 25° C. for 24 hours, and the percent mortality of the stem borer was observed. The test was repeated twice and the results are shown in Table II.

5. Systemic (permeate) test for killing rice stem borer

In a pot of 1/5000 are, a rice plant was planted and rice stem borer eggs were inoculated. After the rice stem borer invaded the rice stems, granules of Formula 3 of each of the insecticidal compounds of this invention were applied on the water surface of the pot in quantities of 2.5 mg of the active ingredient in each 1/5000 are pot. The rice plants were harvested 7 days after the application of the ingredients. The plants were split to observe the morality count of the rice stem borer larvae. The test was repeated 3 times and the results are shown in Table II.

TABLE II

| Compound No. (Table I) | Percent mortality | | | | |
|---|---|---|---|---|---|
| | houseflies | Green rice leafhopper | | rice stem borer | |
| | | Contact effect after 48 hrs. | Systemic effect after 48 hrs. | Contact effect after 24 hrs. | Systemic effect after 7 days |
| 1 | 100 | 90 | 30 | — | 98.8 |
| 2 | 100 | 84 | — | — | — |
| 3 | 100 | 95 | 100 | 53 | — |
| 4 | 95 | — | 100 | — | — |
| 5 | 100 | 85 | — | — | — |
| 6 | 100 | 32 | 62 | — | — |
| 7 | 100 | 100 | 95 | 100 | 100 |
| 8 | 100 | 100 | — | — | — |

6. Tests similar to those above were conducted with compound No. 7 of this invention (Table I) in order to establish the effect of the compound as an insecticide for Tobacco cutworm (Prodenia litura), Common cabbage worm (Pieris rapae crucivora) and Cottony-cushion scale (Icerya; purchasi). Results of the tests are shown in Table III.

TABLE III

| | Method of Application | Mortality(%) | |
|---|---|---|---|
| | | After 24 hr. | After 48 hr. |
| Tobacco cutworm | Contact test with Petri dish | 100 | 100 |
| Common cabbage worm | " | 100 | 100 |
| Cottony-cushion scale | " | 100 | 100 |

7. Miticidal test

Two disks of soyabean leaf having a diameter of 1.5 cm were placed on a filter paper which was placed in a plastic cup containing water to maintain moist conditions. 20 – 40 adult two-spotted spinder mites were placed on the disks. One day after exposure to the mites, 3 ml of an emulsion of compound No. 7 (0.05%, 0.01%) was sprayed on the disks, and they were kept at 25° C for 24 hours. The mortality of the mites is shown in Table IV.

TABLE IV

| | Concentration of emulsion | Mortality of the mites (%) | |
|---|---|---|---|
| | | After 24 hr. | After 24 hr. |
| Compound No. 7 | 0.05% | 100 | 100 |
| | 0.01% | 90.5 | 90.5 |
| Control | | 0 | 0 |

Test of mammalian toxicity

A 5% suspension of each of the compounds of this invention in aqueous gum arabi solution was administered to the stomach of a mouse or a rat through a stomach tube in quantities of 0.2 ml of the suspension per 10 gr body weight of the mouse or rat. The $LD_{50}$ (mg/kg) results obtained by the oral administration of each of the compounds are shown in Table V.

TABLE V

| | $LD_{50}$ (mg/kg) | | | |
|---|---|---|---|---|
| | Mouse | | Rat | |
| | male | female | male | female |
| Compound No. 7 $$\begin{array}{c} CH_3O \\ CH_3O \end{array} \overset{S}{\underset{}{P}} - SCH_2 - \underset{S}{\overset{N}{\bigcap}} Cl$$ | 1410 | 1790 | 877 | 1150 |
| Compound No. 1 | >300 | >300 | | |
| 2 | " | " | | |
| 3 | " | " | | |
| 4 | " | " | | |
| 5 | " | " | | |
| 6 | " | " | | |
| 8 | " | " | | |
| Reference Compound $$\begin{array}{c} CH_3O \\ CH_3O \end{array} \overset{S}{\underset{}{P}} - SCH_2 - \underset{S}{\overset{N}{\bigcap}} CH_3$$ | < 50 | | < 50 | |

Having now fully described this invention, it will be apparent to one of ordinary skill in the art that many changes and modifications can be made thereto without departing from the spirit or scope of the invention as set forth herein.

What is claimed as new and intended to be covered by Letters Patent is

1. An insecticidal and miticidal compound which comprises

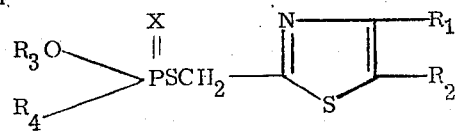

wherein $R_1$ represents a hydrogen atom or a methyl group, $R_2$ represents a halogen atom or a nitro group, $R_3$ represents a methyl or ethyl, $R_4$ represents a methoxy, ethoxy or phenyl group and X represents a sulfur or oxygen atom.

2. The compound of claim 1, wherein $R_2$ represents a halgoen atom and X represents a sulfur atom.

3. The compound of claim 1, wherein $R_4$ represents a methoxy or ethoxy group and $R_1$ represents a hydrogen atom.

* * * * *